United States Patent [19]

Campbell

[11] Patent Number: 5,229,118

[45] Date of Patent: Jul. 20, 1993

[54] FEED AND WATER ADDITIVE AND METHOD OF MAKING SAME

[75] Inventor: William E. Campbell, Morehead, N.C.

[73] Assignee: Aqua-10 Corporation, Beaufort, N.C.

[21] Appl. No.: 769,930

[22] Filed: Sep. 30, 1991

[51] Int. Cl.$^5$ .................... A61K 35/78; A23K 1/00
[52] U.S. Cl. .................... 424/195.1; 426/635
[58] Field of Search .................... 424/195.1; 426/635

[56] References Cited

U.S. PATENT DOCUMENTS

| | | | |
|---|---|---|---|
| 3,912,490 | 10/1975 | Boghosian | 71/28 |
| 4,246,347 | 1/1981 | Neidleman et al. | 435/105 |
| 4,282,324 | 8/1981 | Neidleman et al. | 435/168 |
| 4,443,486 | 4/1984 | Guiseley | 426/584 |

Primary Examiner—John W. Rollins
Attorney, Agent, or Firm—Olive & Olive

[57] ABSTRACT

An animal feed and water additive prepared from seaweed and a method of preparing an additive for animal consumption containing seaweed. Seaweed is dried, ground to a powder, frozen and extracted at warm temperature. A solution of elements, and an oxygen-aloe solution are added to the extract. The extract may be given to animals with their drinking water and/or food.

9 Claims, 1 Drawing Sheet

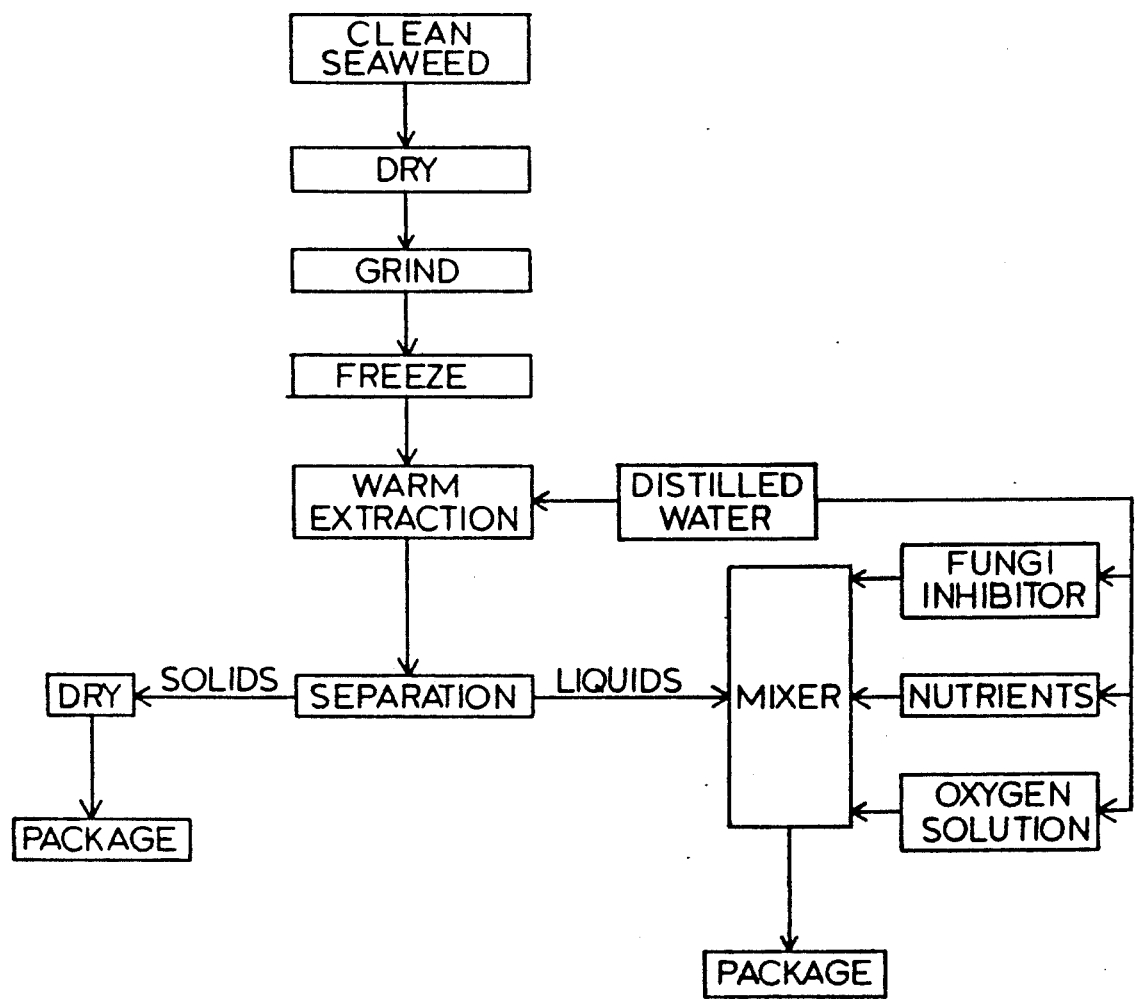

FEED AND WATER ADDITIVE AND METHOD OF MAKING SAME

CROSS-REFERENCE TO RELATED APPLICATIONS

Another patent application on seaweed entitled "Plant Growth Product" is contemporaneously filed herewith.

BACKGROUND OF THE INVENTION

1. Field of the Invention

This invention relates to animal feed supplements, and in particular pertains to animal feed supplements made from seaweed.

2. Description of the Related Art

Seaweed has long served as a feed and feed supplement for domestic and wild animals. Some even graze on seaweed growing on rocky beaches and floating in the ocean water. There are numerous reports of animals such as cows and sheep preferring seaweed to other feed and flourishing when their feed was supplemented with it. Seaweeds such as Laminaria, Fucus, Ascophyllum and Alaria have been made into silage and have been dried and sold as a meal product to be mixed with other feedstuffs.

The value of seaweed is generally attributed to the fact that it is low in carbohydrate and protein, and rich in trace elements, B, D, E and other vitamins, fucoxanthin, and beta-carotene and various growth hormones.

Previous seaweed products are not always uniformly effective because of varying content of the trace elements, and vitamins and other compounds due to the time and location of harvest and the method of processing. Therefore, seaweed products have not always provided significant and reliable benefit to the animals fed the product. An object of the invention herein is to provide a reproducible method of producing a beneficial seaweed product.

Another of the advantages of the instant invention is to increase the "livability" of animals, including livestock and poultry, fed the product of the invention. "Livability" may be judged by determining the proportion of animals on a particular feed regimen or under particular conditions which are alive after a particular period of time. When animals such as poultry are grown for food production, there is generally a loss of a small but constant percentage of the animals prior to bringing the animals to the market which may be due to lack of nutrients, sickness, improper growing temperature, etc. This means than the feed eaten prior to death of the animals and the other costs expended on the animals that do not survive are wasted.

Another way to measure the value of a feed product is to determine whether the product decreases the amount of fat in animals fed the product, and results in an increased percent of protein. It is a further object of this invention to provide a feed product which results in a decreased fat content of animals fed the product.

Another object of this invention is to provide a method and product enabling inhibition of microbial pathogens. In particular, Salmonella typhimurium, a human pathogen, is widespread and a problem in poultry. Other Salmonella, for example S. enteritidis, are present in even greater numbers of flocks and are more detrimental to the poultry. Researchers have found that selected carbohydrates reduced attachment of S. typhimurium to ceca of 1-week old chicks but not 2-week old chicks. The most effective carbohydrates are N-acetyl-D-galactosamine, L-fucose, D-galactose, L+arabinose and D+mannose. See McHan et al., Avian Diseases 33:340, 1989. These carbohydrates are often expensive to purify and use for addition to food. Salmonella are also often found in cattle, swine and other livestock. It is thus another object of this invention to provide a less expensive product having the ability to reduce Salmonella attachment.

Other objects and advantages will be more fully apparent from the following disclosure and appended claims.

SUMMARY OF THE INVENTION

The product of the invention is a seaweed product which is treated by drying seaweed and then, grinding, freezing and then extracting the seaweed at a warm temperature, and then adding chelated elements and oxygen. The product may be used as an animal feed or water additive to decrease fat content, decrease problems with microbial pathogens such as Salmonella, and increase livability.

In agricultural biotechnology, efforts have been made to feed beneficial microorganisms such as lactic acid bacteria to animals. The product herein may serve as both a probiotic and a pre-probiotic in that it may both add beneficial microorganisms and stimulate both native and added beneficial microorganisms.

Other aspects and features of the invention will be more fully apparent from the following disclosure and appended claims.

BRIEF DESCRIPTION OF THE DRAWINGS

FIG. 1 is a schematic drawing of the method of making an animal feed according to the invention.

DETAILED DESCRIPTION OF THE INVENTION AND PREFERRED EMBODIMENTS THEREOF

The instant invention is a seaweed product prepared by drying a seaweed such as Sarcassum. After drying, the seaweed is ground to a powder. The powder is frozen briefly and then extracted with a lengthy period of agitation in warm water.

Additives to the seaweed extract increase its efficacy and benefits as an additive to animal feeds and water. Thus, a solution of trace elements is added to supplement the animal diet. Formaldehyde in trace quantities acts as a preservative. An oxygen-containing solution prepared from hydrogen peroxide and aloe, and preferably also containing potassium stannate, potassium sorbate and a Lactobacillus culture, provides oxygen in an essentially encapsulated form in that the oxygen is held in the liquid and does not flash off or become unavailable. A schematic diagram of the process of the invention is shown in FIG. 1.

The seaweed extraction procedural steps, the identity and amount of the components added to the seaweed extract, and the length of each agitation, cooling or warming step, have been developed over a number of years, with the final product as disclosed herein being the end result of considerable experimentation and man intermediate less effective products of differing composition and resulting from different preparation steps.

It is important that the water used in preparing the product be distilled water so undesirable elements or contents from tap water are not added to the product.

In particular, the seaweed-containing additive for animal feed and water comprises:

(a) an extract of seaweed formed by drying, grinding, freezing, extracting in warm water, and treating the seaweed with formaldehyde;
(b) trace elements;
(c) a stannate compound;
(d) a peroxide;
(e) aloe concentrate;
(f) a sorbate compound or other perservative; and
(g) distilled water.

The additive is prepared by:
(a) obtaining dry, ground seaweed;
(b) freezing the dry, ground seaweed;
(c) suspending the dry, ground seaweed in water with agitation and warming to allow extraction of the seaweed;
(d) separating liquid from the suspension of extracted seaweed;
(e) agitating the liquid with formaldehyde;
(f) adding a solution of trace elements; and
(g) adding an oxygen-containing liquid, prepared from water, a peroxide and aloe.

The peroxide may be obtained for example, from hydrogen peroxide, urea peroxide and calcium peroxide, and is preferably present at about 0.5% of the additive.

The additive of the invention can be used, but is not limited, to provide an animal with fucose, galactose and other sugars, to decrease undesirable gastrointestinal microorganisms, to keep Salmonella cells from attaching to the intestinal cell walls of poultry and other animals, and to provide trace elements.

The feature and advantages of the present invention will be more clearly understood by reference to the following examples, which are not to be construed as limiting the invention.

EXAMPLES

Example I - Obtaining and Preparing the Seaweed Extract

Seaweed of the genus *Sargassum*, preferably *S. natan* or *S. fruitan*, or other Phaeophyta, or seaweed of other genera of the order Fucales, is harvested by known means from known beds in the Atlantic Ocean off Beaufort, N.C. Floating, detached beds approximately 40–200 miles out have been found to provide acceptable seaweed. The wet seaweed is cleared from foreign matter such as shells, ropes, bottles and other detritus and is placed on drying racks to dry in the sun. When the moisture-content of the seaweed is no greater than about 14%, which generally takes 2–8 days, the seaweed is ground to a powder using a Fitzmil Model D Comminuting Machine (W. J. Fitzpatrick, Chicago, Ill.). The powder may be about 10 to 60 mesh and is preferably about 60 mesh.

The dried, ground seaweed is chilled to a temperature substantially below the freezing point of water. Preferably it is chilled to a temperature of about $-100°$ F. and frozen for 5–20 minutes using gaseous $N_2$ evaporating from liquid nitrogen as the cryogenic substance and circulating the cold gaseous $N_2$ through the powder. The freezing treatment ruptures the seaweed cells to allow better release of cellular contents during subsequent extraction.

The ground seaweed is weighed and added to a tank having a blending agitator in the tank and having water-containing coils for temperature adjustment. Distilled water is added to a final volume so that the seaweed is in a ratio of about 1 lb seaweed powder to 22–176 lbs added water (wt/wt) and is preferably at a ratio of 1 to about 44. When about half of the final volume of water has been added, the agitator and the heating coils are turned on so that water at a temperature equal to about 103° F. is circulated through the coils. After the remaining water is added to the seaweed, and the temperature of the seaweed slurry reaches a desired final temperature of about 100°–70° F., and preferably about 103°, the temperature is maintained there. The slurry is agitated continuously, preferably for about 48–200 hours and most preferably for about 120 hours. The length of time of extraction at the warm temperature affects the amount of cytokinin, amino acids, and other components extracted from the seaweed.

Solids are separated from the liquid extract through a 60 mesh shaker screen. The liquid flows into a blending tank. Formaldehyde may be added at this point in a volume such that the final concentration per volume is about 0.1% of a 37% formaldehyde solution (wt/wt). The formaldehyde is at a very low level, and serves as a preservative. Alternate preservatives may be used.

After agitation of the extract with the formaldehyde for about 12 hours, a prepared solution of elements is added with continued agitation at a ratio of 0.2 to 1.8% and preferably about 1.2% by volume. Table I shows the preferred amount of each compound or a solution of each compound to add to make 1 ton (2,000 lbs) of elemental solution to use to add to the extract.

TABLE I

| Compound | Weight Added | Added Weight Percent |
| --- | --- | --- |
| 8% Manganese Sulfate | 250.0 lbs. | 12.50% |
| 25% Copper Sulfate | 9.6 lbs. | 0.48% |
| 20% Iron Sulfate | 12.0 lbs. | 0.60% |
| 12.3% Zinc Sulfate | 617.9 lbs. | 30.89% |
| 20.5% Sodium Boron (Solabar) | 24.4 lbs. | 1.22% |
| 36% Sodium Molybdate | 1.4 lbs. | .07% |
| Citric Acid | 303.6 lbs. | 15.18% |
| Water | 781.0 lbs. | 39.05% |

The final concentration of the individual trace elements in the elemental solution is: soluble manganese (Mn), 1.00%; chelated copper (Cu), 0.12%; chelated iron (Fe), 0.12%; chelated zinc (Zn), 3.80%; boron (B), 0.25% and molybdenum, 0.025%.

Example II - Preparation of Oxygen-Containing Liquid (Oxygen Base)

An Oxygen Base (500 gallons) is prepared according to the formulation and in the order shown in Table II.

TABLE II

| Ingredient | Amount | When and How Added |
| --- | --- | --- |
| Distilled $H_2O$ | 200 gallons | Initially |
| Potassium Stannate | 1000 cc | Add to $H_2O$ and agitate continuously |
| Distilled $H_2O$ | 200 gallons | Add 60 min. after potassium stannate and agitate continuously |
| Hydrogen Peroxide (50) or other peroxide | 50 gallons | Add immediately after second water addition; agitate continuously |
| Aloe Concentrate | 50 gallons | Add immediately after $H_2O_2$; agitate continuously |
| Potassium Sorbate | 0.2% wt/wt (0.05–0.3%) | Add after aloe; agitate |
| Lactobacillus | 125 ml | Add 60 min. after |

TABLE II-continued

| Ingredient | Amount | When and How Added |
|---|---|---|
| acidophilus (frozen concentrate) | | potassium sorbate |

Aloe concentrate may be obtained from Vera Products, Inc., (Harlingen, Tex.). *Lactobacillus acidophilus*, which is optional, is preferably added to the Oxygen Base, and may be obtained from Miles Laboratories, Inc. (Madison, Wis.). The Oxygen Base is a clear liquid and may be stored in sealed drums for use as needed as in Example III.

The peroxide serves as the source of oxygen. The potassium stannate is added to the Oxygen Base to stabilize the oxygen. The aloe concentrate has the unexpected effect of stabilizing the oxygen from the peroxide in the product and of keeping the oxygen from "flashing off" during prolonged storage or when using the product in an animal's food or water. The potassium sorbate is a antifungal substance and serves to inhibit fungi and yeast. Alternatively, other antifungal substances, for example, sodium propionate, sodium formate, propionic acid or formic acid, may be used. Addition of a Lactobacillus culture serves to help in competitively excluding unwanted bacteria.

Example III - Adding Oxygen to Seaweed Extract

The Oxygen Base of Example II is added to the final extract of Example I after about 12 hours of continuous agitation (following element addition) at a concentration of about 2-10%, and preferably about 10%, by volume. The product of this Example III thus contains the peroxide component, such as $H_2O_2$, at a concentration of about 1-5%, preferably about 5%. The mixture is agitated for 360 minutes. The product having the extract of Example I with or without Oxygen Base may be used for poultry and livestock as a food and/or water additive.

Table III shows the formulations of various embodiments of the seaweed extract of the invention. These formulations are examples only and are not meant to be limiting in the various combinations of components and processing parameters that may be used.

TABLE III

| | |
|---|---|
| Formulation 1 | |
| Seaweed, dried and ground | 1 lb. |
| Distilled water | 30 lbs. |
| Time of agitation at about 100° F. | 50 hrs. |
| Elemental solution (% volume added) | 1% |
| Formulation 2 | |
| Same as Formulation 1, plus 3% Oxygen Base | |
| Formulation 3 | |
| Same as Formulation 1, plus 5% Oxygen Base | |
| Formulation 4 | |
| Same as Formulation 1, plus 10% Oxygen Base | |
| Formulation 5 | |
| Seaweed, dried and ground | 1 lb. |
| Distilled water | 44 lbs. |
| Time of agitation at about 103° F. | 120 hrs. |
| Elemental solution (1% volume added) | 1.2 % |
| Formulation 6 | |
| Same as Formulation 5, plus 3% Oxygen Base | |
| Formulation 7 | |
| Same as Formulation 5, plus 5% Oxygen Base | |
| Formulation 8 | |
| Same as Formulation 5, plus 10% Oxygen Base | |
| Formulation 9 | |
| Seaweed, dried and ground | 1 lb. |
| Distilled water | 150 lbs. |

TABLE III-continued

| | |
|---|---|
| Time of agitation at about 115° F. | 100 hrs. |
| Elemental solution (% volume added) | 1.8% |
| Formulation 10 | |
| Same as Formulation 9, plus 10% Oxygen Base | |
| Formulation 11 | |
| Seaweed, dried and ground | 1 lb. |
| Distilled water | 44 lbs. |
| Time of agitation at about 103° F. | 120 hrs. |
| No Elemental Solution | |
| Formulation 12 | |
| Same as Formulation 11, plus 5% Oxygen Base | |

Example IV - Feeding Poultry

The liquid mixture of Example III may be fed to poultry in a number of ways. It is recommended that for turkeys, 1 cc/gallon drinking water and/or 14 oz per ton of feed be given as soon as the birds can drink and eat dry food, respectively. For broiler chickens, 3 cc/gallon drinking water and 45 oz per ton feed are preferred.

Example V - Livability Results

The product of Example III (Formulation 5) is administered to turkeys in their drinking water beginning at day 1 of the birds' lives, preferably as an oral solution before they consume anything else. The level of product in the water is about 1 cc/gallon. Control birds are watered without the product. Two groups of birds, with about 6000 birds per group are subjected to each treatment (product treatment and control treatment). At market time, the turkeys given the product are of a sufficient weight for marketing an average of about 1.5 days earlier than the control turkeys and the percent livability increases about 2.5 to 3.0% for the product-treated turkeys. Condemnation of birds unfit for the market is reduced by about 80% by administration of the product of the invention. This percent translates into an average gain for the grower of about 30-60 cents per turkey.

Example VI - Fat Content Results

Turkeys to which the product of the invention is administered according to Example V have on the average about 15-25% less total body fat, with about a 20-25% reduction in fat pad weight. Total body fat and fat pad weight are determined using standard techniques known in the art. Similar results are found for broilers. It is to be noted that the weight of the birds given the product of the invention is equivalent to or slightly greater than the controls, indicating that the fat has not just been lost but has bee replaced by protein.

Example VII - In Vitro Blocking of Salmonella Receptor Sites

Ceca from 5-day old chicks are collected and challenged with Salmonella typhimurium, using standard in vitro techniques. Test ceca are immersed for ten minutes in a 50% solution of the product of the invention in saline prepared according to Example III plus $1 \times 10^8$ cells of *S. typhimurium*. Control ceca are immersed for ten minutes in a saline solution of $1 \times 10^8$ cells of *S. typhimurium* only. The ceca exposed to both the product of the invention and salmonella have only between 1 and 10 attached cells per gram of cecal tissue, while the control ceca have nearly $10^4$ attached cells per gram, which is nearly a 4-log reduction due to the product of the invention.

Example VIII - In Vivo Effects

Poultry broilers have the product of the invention added to their water and/or dry feed according to Example IV beginning at day 1. The birds are either raised in a house having *Salmonella typhinurum* and *S. enteritidis* present, or are given *Salmonella* in their feed. After 21 days, the birds are killed and their ceca evaluated for the presence of Salmonella. Birds which have been given the product of the invention have $10^3$ fewer Salmonella per gram of ceca tissue than those which have not received the product.

This result is consistent with the fact that turkeys treated with the product according to Example V and raised under normal growing conditions are also found to be essentially free of *Salmonella enteritidis* and other microbial pathogens of poultry. For example, when turkeys are placed in a turkey house where *S. enteritidis* had been present in previous flocks of turkeys, there is a reduction in the presence of *S. enteritidis* if the turkeys are given the seaweed product. If successive flocks in the turkey house are also given the seaweed product, the occurrence of *S. enteritidis* continues to decrease. By the time a fourth flock is given the seaweed product in the turkey house, the *S. enteritidis* is reduced or essentially eliminated so that it generally is no longer a problem. This effect is increased if the walls of the turkey house are also sprayed with the seaweed product. The effect of the seaweed product appears to be due to the presence of high oxygen and high sugar levels in the seaweed product.

Example IX - Sugar Components of Seaweed Extract

Analysis of the seaweed extract product of Example I using standard methods of glycosyl composition analysis including gas analysis, reveals that nearly 25% of carbohydrates in the product are in the form of fucose, about 20% are galactose and about 12% each are mannose, xylose and glucose, with significant amounts of glucuronic acid and rhamnose.

Example X - Feeding Livestock

Livestock such as cattle and pigs are preferably fed the product of Example III at the rate of about 1 cc/head/day in water and/or 12 oz/ton of feed. The product of the invention is fed as soon as the animals can consume dry feed or drink water. The results are similar to poultry results with there being a significant decrease in animal fat. When measured by the Canadian point system, the hog index increases from an average of about 2.5 for controls to 3.75-4.5 for animals given the product of the inventions. This is a significant increase in value and decrease in fat.

Example XI - Solids Use

This Example describes how solids separated from the liquid extract in Example I are made into a useful byproduct. The solids are placed on a screen or conveyor belt and are exposed to a hot air blower to remove moisture until it has a dry granular texture and is sufficiently dry to be packaged After drying, the refined solids are packaged in bags or sold in bulk for use as a dried fertilizer product or as a feed supplement for livestock and poultry.

While the invention has been described with reference to specific embodiments thereof, it will be appreciated that numerous variations, modifications, and embodiments are possible, and accordingly, all such variations, modifications, and embodiments are to be regarded as being within the spirit and scope of the invention.

What is claimed is:

1. A seaweed-containing additive for animal feed and water, comprising:
   (a) an extract of seaweed obtained by drying, grinding, freezing, and extracting in warm water to cause cellular rupture and retain biological activity, wherein about 1 lb of dried seaweed is added to about 22-176 lb of water to prepare said extract; and
   (b) an oxygen-containing liquid prepared from distilled water, about 10% of a peroxide component by volume and about 10% of aloe by volume.

2. A seaweed-containing additive for animal feed and water according to claim 1, further comprising about 0.2 to about 1.8% of a trace element solution containing about 1% soluble manganese, 0.12% chelated copper, 0.12% chelated iron, 3.8% zinc, 0.25% boron, and 0.025% molybdenum, a stannate compound at a concentration of about 1000 cc stannate per 500 gallons oxygen-containing liquid, and a sorbate compound at a concentration of about 0.2% by weight of the oxygen-containing liquid.

3. A seaweed-containing additive for animal feed and water according to claim 1, wherein the peroxide is at a concentration of about 0.5% in the additive.

4. A process of preparing an additive for animal feed and water from seaweed, comprising:
   (a) obtaining dry, ground seaweed;
   (b) freezing the dry, ground seaweed to rupture the seaweed cells and retain biological activity;
   (c) suspending the dry, ground seaweed in water with agitation for about 48-200 hours and warming to about 100°-170° F. to allow extraction of the seaweed, wherein about 1 lb of dried seaweed is added to about 22-176 lb of water to prepare a seaweed extract;
   (d) separating liquid from the suspension of extracted seaweed; and
   (e) adding 2-10% by volume of an oxygen-containing liquid to the separated liquid of step (d), said oxygen-containing liquid prepared from water, a peroxide and aloe, said oxygen-containing liquid containing about 10% aloe and about 10% peroxide by volume.

5. A process of preparing an additive for animal feed and water according to claim 4, further comprising agitating the liquid with formaldehyde at a concentration by volume of about 0.1% of a 37% solution and adding about 0.2 to about 1.8% of a trace element solution containing about 1% soluble manganese, 0.12% chelated copper, 0.12% chelated iron, 3.8% zinc, 0.25% boron and 0.025% molybdenum.

6. A process of preparing an additive for animal feed and water according to claim 4, wherein the dry, ground seaweed is frozen by exposing it to a temperature of about $-100°$ F.

7. A process of preparing an additive for animal feed and water according to claim 4, wherein the dried, ground seaweed is a Sargassum seaweed and has a moisture content of about 14 per cent before suspension in water.

8. A process of providing an animal with fucose, galactose, and other nutrients, comprising:

(a) extracting seaweed with drying, grinding, and freezing said seaweed, suspending the seaweed in distilled water, extracting the seaweed at a warm temperature to allow extraction of the seaweed by rupture of the seaweed cells, while retaining biological activity, separating liquid from the suspension, wherein about 1 lb of dried seaweed is added to about 22-176 lb of water to prepare a seaweed extract;

(b) agitating said liquid for about twelve hours; and (c) adding said liquid to feed or water of the animal.

9. A process of decreasing undesirable gastrointestinal microorganisms of poultry or livestock, comprising:

(a) providing an extract of seaweed, said extract prepared by drying, grinding, and freezing said seaweed, suspending the seaweed in distilled water, extracting the seaweed at a warm temperature to cause cellular rupture and retain biological activity, separating liquid from the suspension, wherein about 1 lb of dried seaweed is added to about 22-176 lb of water to prepare a seaweed extract;

(b) agitating said liquid for about twelve hours;

(c) forming an oxygen mixture by adding oxygen base at a concentration of about 2 to 10 per cent to said liquid, said oxygen base containing about 5% peroxide; and (d) adding said oxygen mixture to feed or water of said poultry or livestock.

* * * * *

UNITED STATES PATENT AND TRADEMARK OFFICE
CERTIFICATE OF CORRECTION

PATENT NO. : 5,229,118
DATED : July 20, 1993
INVENTOR(S) : William E. Campbell, Morehead, N.C.

It is certified that error appears in the above-identified patent and that said Letters Patent is hereby corrected as shown below:

Column 2, line 42 - change "Sarcassum" to --Sargassum--.

Column 2, line 63 - change "man" to --many--.

Column 3, line 34 - change "feature" to --features--.

Signed and Sealed this

Twenty-ninth Day of March, 1994

Attest:

BRUCE LEHMAN

*Attesting Officer*  *Commissioner of Patents and Trademarks*